Feb. 23, 1971     K. HEHL     3,564,658
APPARATUS FOR INJECTION MOLDING
Filed July 12, 1968     4 Sheets-Sheet 4

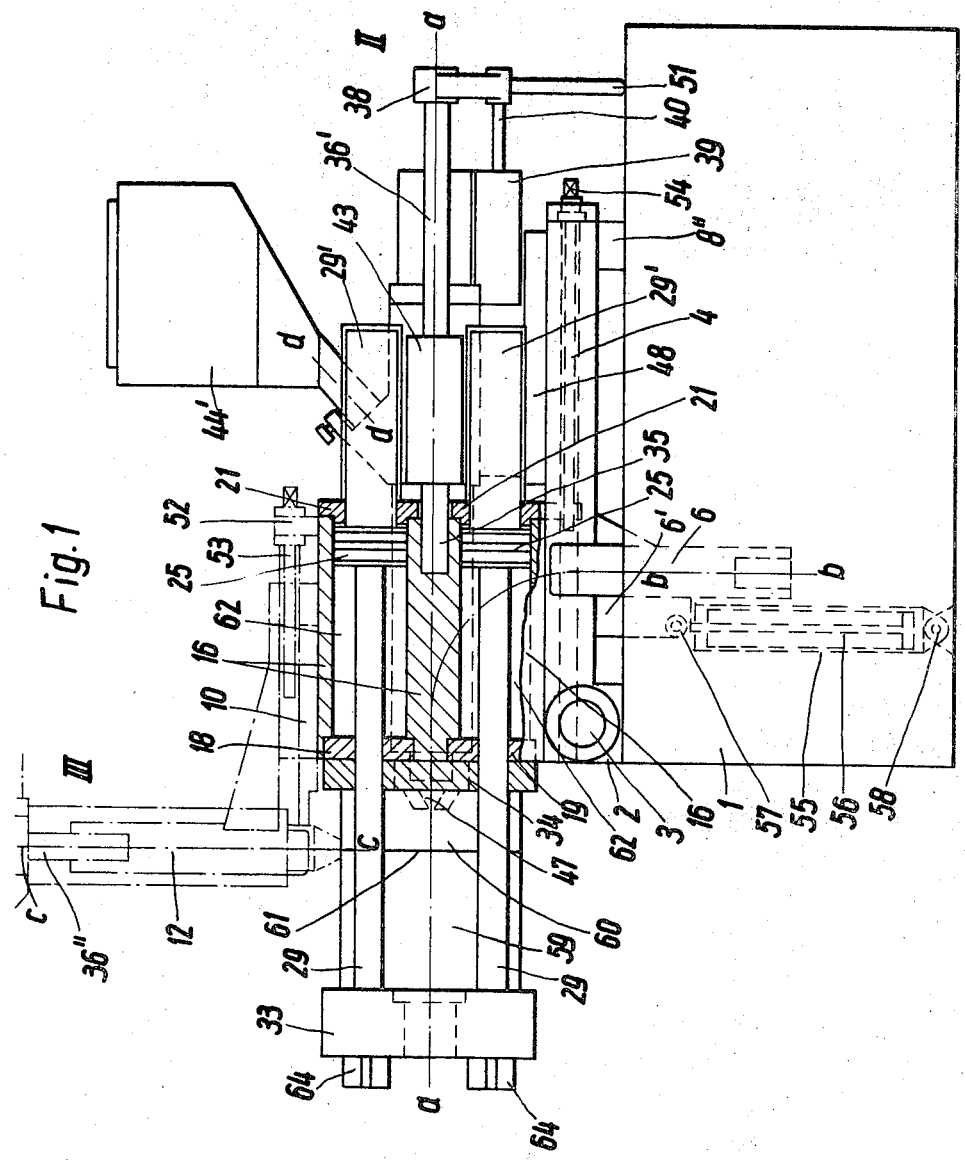

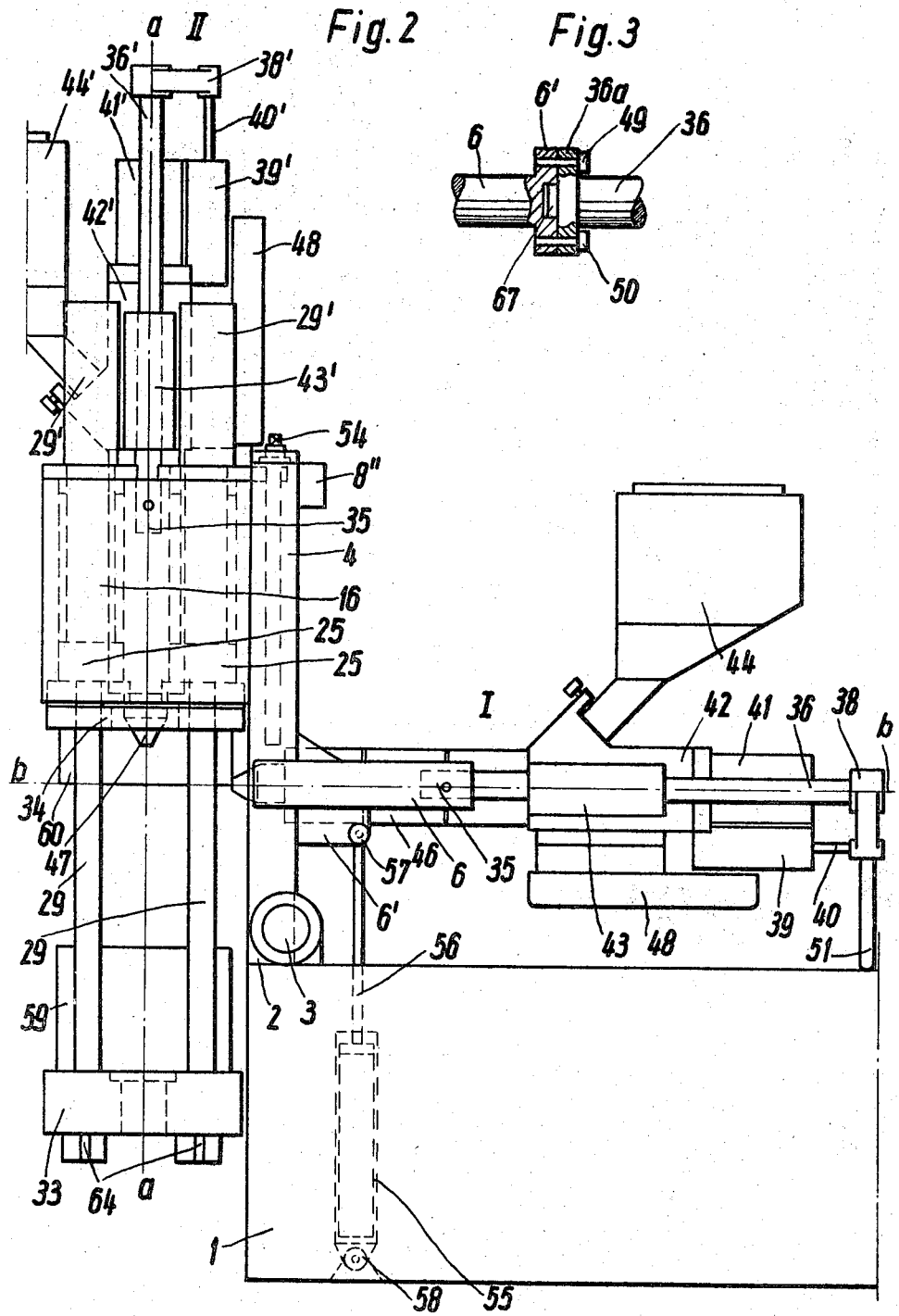

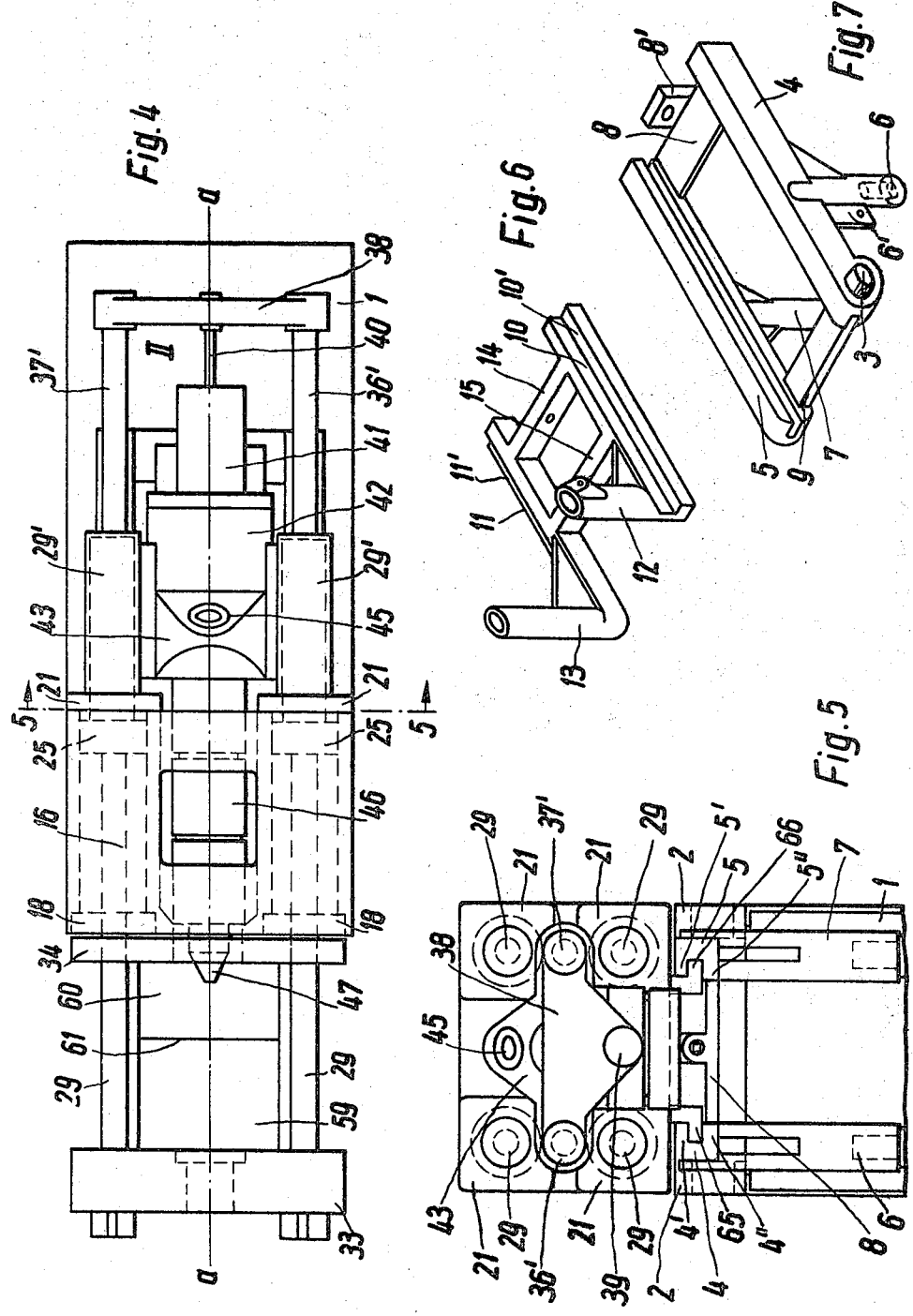

Inventor:
Karl Hehl
BY Spencer & Kaye
Attorneys

United States Patent Office 3,564,658
Patented Feb. 23, 1971

3,564,658
APPARATUS FOR INJECTION MOLDING
Karl Hehl, Lossburg, Wurttemberg, Germany, assignor to Arburg Maschinenfabrik, Wurttemberg, Germany
Filed July 12, 1968, Ser. No. 744,457
Claims priority, application Germany, Apr. 20, 1968,
P 17 78 350.5
Int. Cl. B29f 1/00
U.S. Cl. 18—30          17 Claims

ABSTRACT OF THE DISCLOSURE

Injection molding apparatus including a base and an injection mold clamping means which is displaceable in its axial direction as well as pivotal by at least 90° with respect to such base by means provided therefor. Such clamping means being provided with at least one material injecting means coaxially fastened thereto and means for perpendicularly connecting an additional injecting means.

BACKGROUND OF THE INVENTION

The present invention relates to a machine for processing synthetics, particularly, injection molding apparatus wherein a clamping unit for the injection mold is displaceable and pivotal by 90° with respect to the base of the apparatus, and the clamping unit having at least one injection unit coaxially fastened thereto and a device for perpendicularly connecting an injection unit.

"Coaxial" in the above sense means that the injection axis is disposed parallel to the opening or, respectively, closing direction of the clamping unit. The synthetic, in this case, is injected into the injection mold through the central aperture in a clamping plate adjacent to the injection cylinder in a direction which is perpendicular to the separating groove of the injection mold (injection transverse to the separating groove).

"Perpendicular" in the above sense means that the injection axis is disposed transverse to the opening or closing direction of the clamping unit. In this case, the synthetic is injected into the separating groove of the injection mold (injection into the separating groove).

SUMMARY OF THE INVENTION

It is an object of the present invention to provide apparatus of the type mentioned in the introductory paragraph so as to allow adjustments with minimum effort for all sizes of such apparatus. It is also a particular object of the present invention to provide, regardless of size, sufficient flexibility in such apparatus to allow the taking up of different operational positions. Thus, the injection axis of the apparatus can be adapted to injection molds of varying structural depths when injecting into the separating groove.

This problem is solved, according to the present invention, by providing that the clamping unit is axially movable on struts which are connected, via a pivoting axis, to the base of the machine. Advisably the struts are provided with connecting elements for perpendicularly connecting an injection unit. According to a preferred embodiment of the invention, the device for perpendicularly connecting an injection unit is disposed in a guide of the clamping unit at the side facing the struts. The injection unit is then movable parallel to the closing direction of the clamping unit.

BRIEF DESCRIPTION OF THE DRAWINGS

FIG. 1 is a side view of the apparatus, according to the invention, which shows a clamping unit and injection unit horizontally and coaxially disposed with respect to each other and which partially shows in shadow an additional injection unit perpendicularly disposed on the clamping unit.

FIG. 2 is a side view of the apparatus of FIG. 1 which shows the clamping unit and injection unit vertically and coaxially disposed with respect to each other and which shows an additionally provided injection unit perpendicularly disposed on the base of the apparatus.

FIG. 3 is a detail view of one embodiment of the frontal connection between two struts.

FIG. 4 is a plan view of part of the apparatus according to FIG. 1, without the additional rectangularly disposed injection unit.

FIG. 5 is an axial view of the apparatus, according to FIG. 4, as seen from 5—5.

FIG. 6 is a perspective detail view of a connecting means for the additional injection unit according to FIG. 1.

FIG. 7 is a perspective detail view of the means for pivotally mounting the clamping and injection units of FIGS. 1 and 2 to the base of the apparatus.

DESCRIPTION OF THE PREFERRED EMBODIMENT

Figure 8:
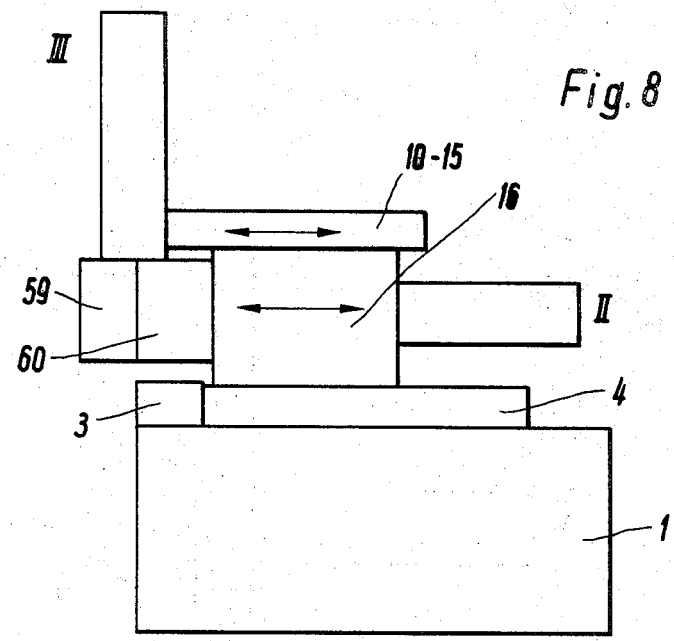
FIG. 8 is a schematic illustration of the form of the invention according to FIG. 1.

Referring to FIGS. 1, 2, 5 and 7, the base of the apparatus is provided at the left end of its top surface with a projection 2. The projection 2 forms a support for an axle 3 to the ends of which two struts 4, 5 are attached. The struts 4, 5 are supported in horizontal position (FIG. 1) at their free ends with the aid of a support 8″ on the base of the apparatus 1 and are pivotal from their horizontal position, according to FIG. 1, into a vertical position, according to FIG. 2. At a distance from the axle 3, connecting elements 6, 7 are provided at the struts 4, 5 for struts 36 (FIG. 2) of a further injection unit II. These connecting elements 6, 7 perpendicularly extend from struts 4, 5, respectively, and are in the form of sleeves. When the apparatus is in the operating position according to FIG. 2, the supporting struts of an injection unit I are inserted and secured in the free ends of these sleeves 6, 7. The distance of the center, or injection, axis b—b (FIG. 1) of the sleeve 6 from the pivot axis of axle 3 is equal to the distance of such pivot axis from the central plane a—a of the clamping means or unit 16–34. The struts 4, 5 are connected together by lateral struts 8, 9 as best seen in FIG. 7, so that a stable frame 4, 5, 8, 9 results. It can be seen in FIGS. 5 and 7 that the struts 4, 5 are constructed as profile rails having a U-shaped cross section. In the U-shaped profile defined by 4′, 4″, and 5′, 5″, respectively, of the rails 4, 5 angular fillets 65, 66 are disposed which support the central block 16 of the clamping unit 16–34. There is, however, no reason why the struts 4, 5 can not be constructed, for instance, in the form of cylindrical spars which could then be inserted into a laterally open bore of the cylinder block.

As best seen in FIG. 1 in conjunction with FIG. 5, four parallel bores are disposed in the approximately cubic block 16 of the clamping unit 16–34. These bores form cylinder chambers 62 in which pistons 25 are disposed. The cylinder chambers 62 are closed off at their frontal face by cylinder covers 18. Piston rods 29 are brought through bores in the cylinder covers 18 and extend from block 16 of the clamping unit. The free ends of the piston rods are taken up by the movable mold clamping plate 33 which is secured by nuts 64. On the frontal face of block 16 the stationary mold clamping plate 34 is disposed. The piston rods 29 are extended on the backside of pistons 25 in the form of piston rods 29'. These piston rods 29' are brought into the rearward covers 21 to act as a seal.

The pair of supporting rods 36', 37' of the injection unit II is brought into block 16 in appropriate bores 35, in such a manner (FIGS. 1 and 2) that the injection axis of this injection unit is disposed in the central plane a—a of the clamping unit. A support bridge 43' for the injection unit II is supported to be axially displaceable on supporting rods 36', 37'. Rods 36', 37' are connected together on their backside by a connecting piece 38 and are supported on the base of the apparatus by means of a supporting yoke 51. The piston rod 40 of a hydraulic unit 39 engages the connecting piece 38 and serves to axially displace the injection unit II. This injection unit is provided with a granule container 44' which can be moved from its position, according to FIG. 1, into a position, according to FIG. 2, by rotating it 180° around its connecting axis d—d.

Referring to FIGS. 1 and 6, a device 10–15 for the connection at right angles of an injection unit III (shown in shadow) is disposed at the side opposite the struts 4, 5 in a guide of the clamping unit 16–34. The device 10–15 is displaceable parallel to the direction in which clamping unit 16–34 is opened or closed. As shown in FIG. 6, device 10–15 is formed by a frame consisting of two profile arms 10, 11 and two lateral rods 14, 15. Ledge-type protrusions 10', 11' extend from profile arms 10, 11 and are introduced into corresponding guide grooves provided in block 16. There is no reason, however, not to locate the device 10–15 for perpendicularly connecting the injection unit III to be displaceable in block 16 of the clamping unit in some other manner. For example, the profile arms 10, 11 can be in the form of round spars and can be brought into laterally open bores of block 16 of the clamping unit (not shown).

At the extended free ends of the profile arms 10, 11, sleeve-shaped connecting elements 12, 13 project at right angles to the direction in which the profile arms extend. The connecting elements 12, 13 accept the supporting rods 36″ of the injection unit III (FIG. 1) at their respective free ends. The struts 36″ are inserted into the sleeves 12, 13 and are secured thereto. The device 10–15 is displaceable, together with the injection unit supported thereby with the aid of a threaded spindle 53. The threaded spindle 53 is held in a guide member 52 of block 16. By operating the threaded spindle 53 it is also possible to adjust the injection axis c—c to the separating groove 61 of injection molds 59, 60 having differing structural depths.

In an operating position, according to FIG. 2, the separating groove of injection molds 59, 60 of varying structural depths is adjusted to the injection axis b—b of the injection unit I. By this arrangement, block 16 and thus the entire clamping unit 16–34, together with injection unit II, is axially displaced in the struts 4, 5. This is done with a threaded spindle 54, which is mounted in a protrusion 8' of lateral bar 8.

In an operating position of the apparatus according to FIG. 1, the injection unit II accomplishes the injection transversely with respect to the separating groove 61. The injection is made through a central opening of the stationary clamping plate 34 into the injection mold 59, 60 by the injection unit II, which is removably fastened to the clamping unit. Simultaneously, it is possible, with the aid of injection unit III, which can be set to accommodate injection molds of varying structural depths by moving the device 10–15, to inject into the separating groove 61 of the injection mold 59, 60.

Referring again to the operating position of the apparatus according to FIG. 2, the injection occurs transversely to the separating groove by means of injection unit II. It is possible to simultaneously inject into the separating groove of the injection mold by means of injection unit I. Axial displacement of the clamping unit makes possible the alignment of the separating groove with injection axis b—b of the injection unit II.

In the FIGS. 1–7, the supporting rods, 36 and its opposite (not shown) as well as 36', 37', respectively, of injection units I and II, are inserted, respectively, into bores 35 of block 16 and the sleeve-shaped connecting elements 6, 7 of struts 4, 5. FIG. 3 shows another embodiment of a connection between the injection unit and the clamping unit wherein a supporting strut 36 of injection unit I is connected to the connecting element 6. In this embodiment the strut 36 of injection unit I extends into a flange 36a which is connected, by means of screw bolts 49, 50, to the corresponding flange 6' of the massive connecting element 6. A centering piece 67 which engages into a recess of flange 6', serves to center the device.

In a similar manner, injection units II and III can also be connected to the clamping unit. As best seen in FIG. 1, a hydraulic lifting apparatus 55–58 is disposed in the base of the machine 1. Cylinder 55 of the lifting apparatus is mounted on the bottom of the apparatus base. The piston rod 56 is flexibly mounted to a protrusion 6' of the connecting element 6 and is thus directly connected to strut 4. In a heavy model of the apparatus, two lifting devices can act in a symmetrical arrangement on both struts 4, 5 in that their piston rods 56 engage the protrusions of the connecting elements 6, 7. The lifting device, in any case, permits an easy resetting of the apparatus from an operating position according to FIG. 1 to an operating position according to FIG. 2 and vice versa.

As can best be seen from FIGS. 1 and 2, injection units I and III are only put in place in their respective mounting members when the clamping unit 16–34 is in its vertical position (FIG. 2) and its horizontal position (FIG. 1), respectively. Injection unit II normally remains fastened to the clamping unit 16–34 and pivots therewith. Thus, unit II swings out of the position to be occupied by unit I when the clamping unit 16–34 is swung into its vertical position (FIG. 2). When clamping unit 16–34 is moved from the position shown in FIG. 2 to the position shown in FIG. 1, the injection unit I is first removed. This leaves only the connecting element 6, 7 remaining to swing down into the area of the base (FIG. 1). The injection unit III is removed and mounted in a similar manner.

A rotary drive 42 is permanently connected to the hydraulic drive cylinder 41 for the conveying screw. The temperature-controlling device 48 is borne by the injection unit.

The stabilizing block 16 of the clamping unit is provided with a bore through which pass the injection cylinder 46 and its nozzle 47. On one frontal face it bears the injection mold and on another frontal face the injection unit II. Such a construction of the clamping unit is particularly favorable for the realization of a displaceable mount in the struts 4, 5 and guarantees an optimum distribution of weight and greater insensitivity under mechanical stress.

Figure 9:
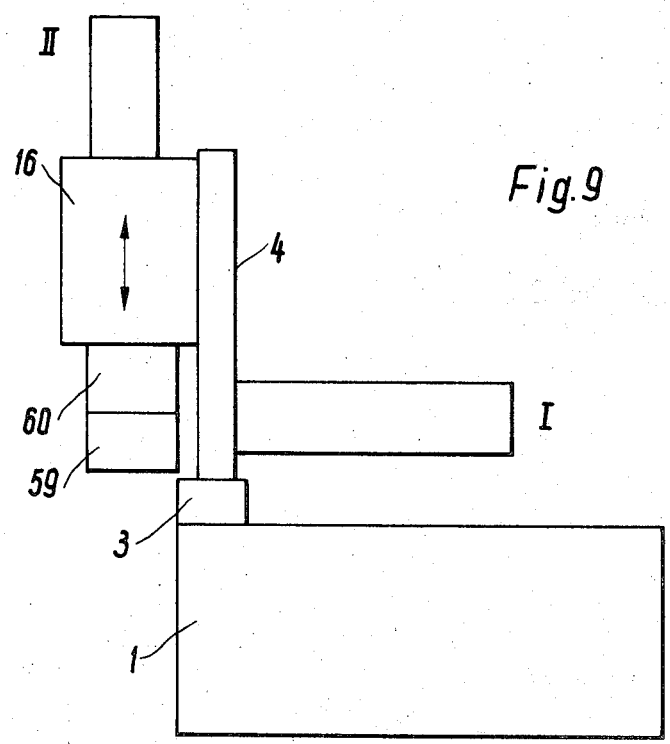
FIG. 9 is a schematic illustration of the form of the invention according to FIG. 2.

FIGS. 8 and 9 show schematically the configuration and the kinematics of the machine. The operating position in FIG. 8 corresponds to that of FIG. 1 and the operating position in FIG. 9 corresponds to that of FIG. 2.

It will be understood that the above description of the present invention is susceptible to various modifications, changes and adaptations, and the same are intended to be comprehended within the meaning and range of equivalents of the appended claims.

What is claimed is:

1. Apparatus for injection molding comprising in combination:
   (a) a supporting base having an axle member provided therein;
   (b) means defining an axis for clamping together parts of an injection mold, said clamping means being pivotal through an angle of at least 90° and displaceable in its axial direction;
   (c) means defining a pivot axis spaced from and perpendicular to the axis of said clamping means for pivotally connecting said clamping means to said base, and means for facilitating the axial displacement thereof;
   (d) at least one means arranged coaxial with the axes of said clamping means for injecting material into such mold and fastened to said clamping means;
   (e) at least one means fastened to said pivotally connecting means and said axial displacement means for connecting an additional injecting means thereto at right angles to said first mentioned injection means and the pivot axis and spaced from the pivot axis; and
   (f) said pivotally connecting means and said axial displacement facilitating means further defined by having a pair of longitudinally extending, parallel struts on which the clamping means are disposed for longitudinal movement therealong and said struts being pivotally connected to said axle member of said supporting base, thereby to pivotally connect the clamping means thereto.

2. Apparatus for injection molding according to claim 1 wherein said means for connecting said additional injecting means at right angles to said first mentioned injecting means is in the form of connecting elements provided on said struts whereby such additional injecting means is perpendicularly connected to said struts.

3. Apparatus for injection molding according to claim 2 wherein a guide member is provided on said clamping means on the side opposite the side of the clamping means disposed on said struts; and other means for perpendicularly connecting additional injecting means is disposed in said guide member and movable in the axial direction of displacement of said clamping means.

4. Apparatus for injection molding according to claim 3 wherein at least two injecting means, each mounted on two supporting rods, is provided; one of said injecting means being fastened by its corresponding supporting rods to said clamping means; the other of said injecting means being fastened by its corresponding supporting rods to one of said means for perpendicularly connecting additional injecting means whereby the two injecting means are perpendicularly adjustable with respect to each other for simultaneously injecting material into said injection mold by way of a separation groove between parts of said mold and transverse to said groove.

5. Apparatus for injection molding according to claim 4 wherein said clamping means includes a block member, said guide member being provided in said block member and being formed to allow said other means for perpendicularly connecting additional injecting means to be movable in the axial direction of displacement of said clamping means.

6. Apparatus for injection molding according to claim 5 wherein said injecting means fastened to said clamping means includes an injection cylinder and said clamping means includes a bore for receiving such injection cylinder and further includes a frontal face on which the injection mold is disposed and another frontal face on which the other of said injecting means is disposed.

7. Apparatus for injection molding according to claim 6 wherein said clamping means is mounted on four supporting members.

8. Apparatus for injection molding according to claim 7 wherein said clamping means is movable along said supporting members thereby to adjust the separating groove between said parts of said injection mold being clamped together and to locate such groove to receive an injection of material from said injecting means.

9. Apparatus for injection molding according to claim 8 wherein a threaded spindle is provided for moving said clamping means.

10. Apparatus for injection molding according to claim 9 wherein said clamping means includes a movable plate for clamping said mold; a hydraulic drive means having provided therein pistons including piston heads and piston rods extending from said piston heads; said movable plate being connected directly to ends of said piston rods.

11. Apparatus for injection molding according to claim 10 wherein each of said piston rods also extends on the other side of said piston heads from the movable plate, the extension of said piston rods on the other side of said piston heads having a larger cross section than the extension of the piston rod on the clamping plate side.

12. Apparatus for injection molding according to claim 11 wherein said block member is a generally cubic-shaped block member having cylinder bores formed therein for receiving said pistons; and covers for said cylinder bores.

13. Apparatus for injection molding according to claim 12 wherein at least one hydraulic lifting device is provided, said hydraulic lifting device including a cylinder directly connected to the bottom of said supporting base and having a piston rod directly connected to at least one of said pivotally connecting and axial displacement facilitating means struts.

14. Apparatus for injection molding according to claim 13 wherein said piston rod of said hydraulic lifting device is connected to a protrusion extending from at least one of said connecting elements.

15. Apparatus for injection molding comprising in combination:
   (a) a supporting base having an axle member provided therein;
   (b) means for clamping together parts of an injection mold, said clamping means having a block member and being pivotal through an angle of at least 90° and displaceable in its axial direction;
   (c) means for pivotally connecting said clamping means to said base, and means for facilitating the axial displacement thereof;
   (d) at least one means for injecting material into such mold and having an injection cylinder fastened coaxially to said clamping means, and wherein said block member defines a bore for receiving said injecting means;
   (e) said pivotally connecting means and said axial displacement facilitating means further defined by having a pair of longitudinally extending, parallel struts on which the clamping means are disposed for longitudinal movement therealong and said struts being pivotally connected to said axial member of said supporting base, thereby to pivotally connect said clamping means thereto;
   (f) at least one means in the form of connecting elements provided on said struts for connecting an additional injecting means thereto at right angles to said first mentioned injecting means; and
   (g) a guide member provided on said clamping means on the side opposite the side of the clamping means disposed on said struts, and other means for perpendicularly connecting additional injecting means disposed in said guide member and movable in the axial direction of displacement of said clamping means, said guide member being arranged on a frontal face of said block member and being formed to allow said other means for perpendicularly connecting additional injecting means to be movable in the axial direction of displacement of said clamping means.

16. Apparatus for injecting molding according to claim 15, wherein said supporting base defines a frontal side having an upper horizontal edge, and wherein said axle member is arranged in the area of this upper horizontal edge and parallel thereto.

17. Apparatus for injection molding according to claim 1, wherein said means for connecting an additional injecting means is spaced from the pivot axis a distance substantially equal to the distance between the axis of said clamping means and said pivot axis.

References Cited

UNITED STATES PATENTS

| 2,600,507 | 6/1952 | Leahy et al. | |
|---|---|---|---|
| 3,068,520 | 12/1962 | Hehl | 18—30 |
| 3,086,244 | 4/1963 | Hehl | 18—30 |
| 3,350,746 | 11/1967 | Blumer | 18—30 |

H. A. KILBY, Jr., Primary Examiner

UNITED STATES PATENT OFFICE
CERTIFICATE OF CORRECTION

Patent No. 3,564,658                    Dated February 23rd, 1971

Inventor(s) Karl Hehl

It is certified that error appears in the above-identified patent and that said Letters Patent are hereby corrected as shown below:

Column 1, line 4, after "Maschinenfabrik," insert
--Hehl & Söhne, Lossburg,--.

Signed and sealed this 6th day of July 1971.

(SEAL)
Attest:

EDWARD M. FLETCHER, JR.                WILLIAM E. SCHUYLER, JR.
Attesting Officer                       Commissioner of Patents